US007126115B2

(12) United States Patent
Park et al.

(10) Patent No.: US 7,126,115 B2
(45) Date of Patent: Oct. 24, 2006

(54) METHOD AND APPARATUS FOR A NANOELECTROSPRAYER FOR USE IN MASS SPECTROMETRY

(75) Inventors: Melvin A. Park, Billerica, MA (US); Houle Wang, Billerica, MA (US)

(73) Assignee: Bruker Daltonics, Inc., Billerica, MA (US)

( * ) Notice: Subject to any disclaimer, the term of this patent is extended or adjusted under 35 U.S.C. 154(b) by 0 days.

(21) Appl. No.: 10/866,514

(22) Filed: Jun. 14, 2004

(65) Prior Publication Data

US 2005/0109948 A1 May 26, 2005

Related U.S. Application Data

(63) Continuation of application No. 09/507,424, filed on Feb. 18, 2000, now Pat. No. 6,753,521.

(51) Int. Cl.
*B01D 59/44* (2006.01)

(52) U.S. Cl. ...................................... 250/288; 250/282

(58) Field of Classification Search ................. 250/288
See application file for complete search history.

(56) References Cited

U.S. PATENT DOCUMENTS 4,298,795 A 11/1981 Takeuchi et al.
5,272,337 A 12/1993 Thompson et al.
5,306,412 A * 4/1994 Whitehouse et al. ....... 204/452
5,352,892 A 10/1994 Mordehai et al.
5,469,061 A 11/1995 Linehan et al.
5,504,329 A 4/1996 Mann et al.
5,608,217 A * 3/1997 Franzen et al. ............. 250/288
5,652,427 A * 7/1997 Whitehouse et al. ....... 250/288
5,736,741 A * 4/1998 Bertsch et al. .............. 250/288
5,753,910 A 5/1998 Gourley et al.
5,788,116 A 8/1998 Bednar
5,788,166 A * 8/1998 Valaskovic et al. ......... 239/708
5,810,265 A 9/1998 Cornelius et al.
5,844,237 A * 12/1998 Whitehouse et al. ....... 250/288
5,868,322 A 2/1999 Loucks, Jr. et al.
5,965,883 A 10/1999 Lee et al.
5,975,426 A 11/1999 Myers
6,107,626 A 8/2000 Wang et al.
6,175,112 B1 1/2001 Karger et al.
6,207,954 B1 3/2001 Andrien, Jr. et al.
6,337,480 B1 * 1/2002 Andrien et al. ............. 250/288
6,359,275 B1 3/2002 Bertsch et al.
6,486,469 B1 * 11/2002 Fischer et al. .............. 250/288
6,849,847 B1 * 2/2005 Bai et al. .................... 250/288
6,911,650 B1 * 6/2005 Park ........................... 250/292

* cited by examiner

*Primary Examiner*—Nikita Wells
*Assistant Examiner*—Anthony Quash
(74) *Attorney, Agent, or Firm*—Ward & Olivo

(57) ABSTRACT

The present invention provides a nanospray means and method for use in mass analysis instruments. Specifically, a nanospray assembly is composed in part of a base, union, retainer, and nanospray needle, and an entrance cap, first capillary section, and union. Adjustments to the position of the nanospray needle within this assembly are made independent of the remainder of the ion source. The nanospray assembly is integrated with the remainder of the source by joining the first capillary section (of the nanospray assembly) with a second capillary section which is fixed in the body of the source.

24 Claims, 6 Drawing Sheets

1
2
3
4
5
6
7
8
9
10
11
12
13
14
15
16
17
18
20
21
22
23
24
25

METHOD AND APPARATUS FOR A NANOELECTROSPRAYER FOR USE IN MASS SPECTROMETRY

CROSS-REFERENCE TO RELATED APPLICATIONS

This application is a continuation of application Ser. No. 09/507,424, filed on Feb. 18, 2000, now U.S. Pat. No. 6,753,521.

TECHNICAL FIELD OF THE INVENTION

The present invention relates generally to mass spectrometry and the analysis of chemical samples, and more particularly to nanoelectrosprayers for use in mass spectrometry. Described herein is a nanoelectrospray device for use in mass spectrometry which offers improved ease of use over prior art nanoelectrospray devices.

BACKGROUND OF THE PRESENT INVENTION

The present invention relates to electrospray devices for use in mass spectrometry. Mass spectrometry is an important tool in the analysis of a wide range of chemical compounds. Specifically, mass spectrometers can be used to determine the molecular weight of sample compounds. The analysis of samples by mass spectrometry consists of three main steps—formation of ions from sample material, mass analysis of the ions to separate the ions from one another according to ion mass, and detection of the ions. A variety of means exist in the field of mass spectrometry to perform each of these three functions. The particular combination of means used in a given spectrometer determine the characteristics of that spectrometer.

To mass analyze ions, for example, one might use a magnetic (B) or electrostatic (E) analyzer. Ions passing through a magnetic or electrostatic field will follow a curved path. In a magnetic field the curvature of the path will be indicative of the momentum-to-charge ratio of the ion. In an electrostatic field, the curvature of the path will be indicative of the energy-to-charge ratio of the ion. If magnetic and electrostatic analyzers are used consecutively, then both the momentum-to-charge and energy-to-charge ratios of the ions will be known and the mass of the ion will thereby be determined. Other mass analyzers are the quadrupole (Q), the ion cyclotron resonance (ICR), the time-of-flight (TOF), and the quadrupole ion trap analyzers.

Before mass analysis can begin, however, gas phase ions must be formed from sample material. If the sample material is sufficiently volatile, ions may be formed by electron ionization (EI) or chemical ionization (CI) of the gas phase sample molecules. For solid samples (e.g. semiconductors, or crystallized materials), ions can be formed by desorption and ionization of sample molecules by bombardment with high energy particles. Secondary ion mass spectrometry (SIMS), for example, uses keV ions to desorb and ionize sample material. In the SIMS process a large amount of energy is deposited in the analyte molecules. As a result, fragile molecules will be fragmented. This fragmentation is undesirable in that information regarding the original composition of the sample—e.g., the molecular weight of sample molecules—will be lost.

For more labile, fragile molecules, other ionization methods now exist. The plasma desorption (PD) technique was introduced by Macfarlane et al. in 1974 (Macfarlane, R. D.; Skowronski, R. P.; Torgerson, D. F., *Biochem. Biophys. Res Commoun.* 60 (1974) 616). Macfarlane et al. discovered that the impact of high energy (MeV) ions on a surface, like SIMS would cause desorption and ionization of small analyte molecules, however, unlike SIMS, the PD process results also in the desorption of larger, more labile species—e.g., insulin and other protein molecules.

Lasers have been used in a similar manner to induce desorption of biological or other labile molecules. See, for example, VanBreeman, R. B. : Snow, M.: Cotter, R. J., *Int. J. Mass Spectrom. Ion Phys.* 49 (1983) 35; Tabet, J. C.; Cotter, R. J., *Anal. Chem.* 56 (1984) 1662; or Olthoff, J. K.; Lys, I.: Demirev, P.: Cotter, R. *J., Anal. Instrument.* 16 (1987) 93. Cotter et al. modified a CVC 2000 time-of-flight mass spectrometer for infrared laser desorption of involatile biomolecules, using a Tachisto (Needham, Mass.) model 215G pulsed carbon dioxide laser. The plasma or laser desorption and ionization of labile molecules relies on the deposition of little or no energy in the analyte molecules of interest. The use of lasers to desorb and ionize labile molecules intact was enhanced by the introduction of matrix assisted laser desorption ionization (MALDI) (Tanaka, K.; Waki, H.; Ido, Y.; Akita, S.; Yoshida, Y.; Yoshica, T., *Rapid Commun. Mass Spectrom.* 2 (1988) 151 and Karas, M.; Hillenkamp, F., *Anal. Chem.* 60 (1988) 2299). In the MALDI process, an analyte is dissolved in a solid, organic matrix. Laser light of a wavelength that is absorbed by the solid matrix but not by the analyte is used to excite the sample. Thus, the matrix is excited directly by the laser, and the excited matrix sublimes into the gas phase carrying with it the analyte molecules. The analyte molecules are then ionized by proton, electron, or cation transfer from the matrix molecules to the analyte molecules. This process, MALDI, is typically used in conjunction with time-of-flight mass spectrometry (TOFMS) and can be used to measure the molecular weights of proteins in excess of 100,000 daltons.

Atmospheric pressure ionization (API) includes a number of methods. Typically, analyte ions are produced from liquid solution at atmospheric pressure. One of the more widely used methods, known as electrospray ionization (ESI), was first suggested by Dole et al. (M. Dole, L. L. Mack, R. L. Hines, R. C. Mobley, L. D. Ferguson, M. B. Alice, *J. Chem. Phys.* 49, 2240, 1968). In the electrospray technique, analyte is dissolved in a liquid solution and sprayed from a needle. The spray is induced by the application of a potential difference between the needle (where the liquid emerges) and a counter electrode. By subjecting the emerging liquid to a strong electric field, it becomes charged, and as a result, it "breaks up" into smaller particles if the charge imposed on the liquid's surface is strong enough to overcome the surface tension of the liquid (i.e., as the particles attempt to disperse the charge and return to a lower energy state). This results in the formation of fine, charged droplets of solution containing analyte molecules. These droplets further evaporate leaving behind bare charged analyte ions.

Electrospray mass spectrometry (ESMS) was introduced by Yamashita and Fein (M. Yamashita and M. B. Fein, *J. Phys. Chem.* 88, 4671, 1984). To establish this combination of ESI and MS, ions had to be formed at atmospheric pressure, and then introduced into the vacuum system of a mass analyzer via a differentially pumped interface. The combination of ESI and MS afforded scientists the opportunity to mass analyze a wide range of samples, and ESMS is now widely used primarily in the analysis of biomolecules (e.g. proteins) and complex organic molecules.

In the intervening years a number of means and methods useful to ESMS and API-MS have been developed. Specifically, much work has focused on sprayers and ionization chambers. In addition to the original electrospray technique, pneumatic assisted electrospray, dual electrospray, and nano electrospray are now also widely available. Pneumatic assisted electrospray (A. P. Bruins, T. R. Covey, and J. D. Henion, Anal. Chem. 59, 2642, 1987) uses nebulizing gas flowing past the tip of the spray. needle to assist in the formation of droplets. The nebulization gas assists in the formation of the spray and thereby makes the operation of the electrospray ionization (ESI) easier. Nano electrospray (M. S. Wilm, M. Mann, *Int. J. Mass Spectrom. Ion Processes* 136, 167, 1994; and M. Mann & M. S. Wilm, U.S. Pat. No. 5,504,329) employs a much smaller diameter needle than the original electrospray. As a result the flow rate of sample to the tip is lower and the droplets in the spray are finer. However, the ion signal provided by nano electrospray in conjunction with MS is essentially the same as with the original electrospray. Nano electrospray is therefore much more sensitive with respect to the amount of material necessary to perform a given analysis.

Many other ion production methods might be used at atmospheric or elevated pressure. For example, MALDI has recently been adapted by Victor Laiko and Alma Burlingame to work at atmospheric pressure (Atmospheric Pressure Matrix Assisted Laser Desorption Ionization, poster #1121, $4^{th}$ International Symposium on Mass Spectrometry in the Health and Life Sciences, San Francisco, Aug. 25–29, 1998) and by Standing et al. at elevated pressures (Time of Flight Mass Spectrometry of Biomolecules with Orthogonal Injection+Collisional Cooling, poster #1272, $4^{th}$ International Symposium on Mass Spectrometry in the Health and Life Sciences, San Francisco, Aug. 25–29, 1998; and Orthogonal Injection TOFMS *Anal. Chem.* 71(13), 452A (1999)). The benefit of adapting ion sources in this manner is that the ion optics and mass spectral results are largely independent of the ion production method used.

An elevated pressure ion source always has an ion production region (wherein ions are produced) and an ion transfer region (wherein ions are transferred through differential pumping stages and into the mass analyzer). The ion production region is at an elevated pressure—most often atmospheric pressure—with respect to the analyzer. The ion production region will often include an ionization "chamber". In an ESI source, for example, liquid samples are "sprayed" into the "chamber" to form ions.

The design of the ionization chamber used in conjunction with API-MS has had a significant impact on the availability and use of these ionization methods with MS. Prior art ionization chambers are inflexible to the extent that a given ionization chamber can be used readily with only a single ionization method and a fixed configuration of sprayers. For example, in order to change from a simple electrospray method to a nano electrospray method of ionization, one had to remove the electrospray ionization chamber from the source and replace it with a nano electrospray chamber (see also, Gourley et al. U.S. Pat. No. 5,753,910, entitled Angled Chamber Seal for Atmospheric Pressure Ionization Mass Spectrometry). In a co-pending application, entitled, Ionization Chamber For Atmospheric Pressure Ionization, this problem is addressed by disclosing an API ionization chamber providing multiple ports for employing multiple devices in a variety of combinations (e.g., any type of sprayer, lamp, microscope, camera or other such device in various combinations). Further, any given sprayer may produce ions in a manner that is synchronous or asynchronous with the spray from any or all of the other sprayers. By spraying in an asynchronous manner, analyte from a multitude of inlets may be sampled in a multiplexed manner.

Analyte ions produced via an API method need to be transported from the ionization region through regions of-differing pressures and ultimately to a mass analyzer for subsequent analysis (e.g., via time-of-flight mass spectrometry (TOFMS), Fourier transform mass spectrometry (FTMS), etc.). In prior art sources, this was accomplished through use of a small orifice or capillary tube between the ionization region and the vacuum region. An example of such a prior art capillary tube is shown in FIG. 1. As depicted, capillary 7 comprises a generally cylindrical glass tube 2 having an internal bore 4. The ends of capillary 7 include a metal coating (e.g., platinum, copper, etc.) to form conductors 5 which encompass the outer surface of capillary 7 at its ends, leaving a central aperture 6 such that the entrance and exit to internal bore 3 are left uncovered. Conductors 5 may be connected to electrical contacts (not shown) in order to maintain a desired space potential at each end of capillary 7. In operation, a first electrode (one of conductors 5) of capillary 7 may be maintained at an extreme negative potential (e.g. −4,500V), while the other electrode (the other of conductors 5), which may form the first stage of a multi-stage lensing system for the final direction of the ions to the spectrometer, may be maintained at a positive potential (e.g., 160 volts).

It is often observed that the capillaries used in MS analysis acquire deposits over time. One major consideration in this respect is the formation of large droplets as part of the electrospray process of analyte solution at the spray needle. Such droplets do not readily evaporate. If these droplets enter the capillary, they may cause the capillary to become contaminated with a residue of analyte molecules and salts. Therefore, through normal operation the capillaries need to be regularly cleaned or even replaced. To do so, the MS system must be turned off before the capillary can be removed—requiring the pumps to be shut down and the vacuum system to be broken—thereby rendering the system unavailable for hours and even days at a time.

Recently, Lee et al. U.S. Pat. No. 5,965,883 attempted to solve this problem in the manner shown by FIG. 2. Shown in FIG. 2 is capillary 8 which comprises an outer capillary sleeve 9 surrounding an inner capillary tube 10. Sleeve 9 has substantially cylindrical inner surface 11 and outer surface 14. Similarly, tube 10 has substantially cylindrical inner surface 12 and outer surface 13. The innermost channel, or bore, of capillary 8 is substantially formed by inner surface 12 of tube 10. Capillary 8 is substantially radially symmetrical about its central longitudinal axis 15 extending from an upstream end 16 to a downstream end 17. At each end, capillary 8 has a conductive end cap 18 comprising the unitary combination of a tubular body 19 having cylindrical inner 20 and outer 21 surfaces and an end plate 22 having inner 23 and outer 24 surfaces with a central aperture. The body of end cap 18 encompasses and is in circumferential engagement with a reduced diameter portion 25 of the sleeve 9 adjacent the end of the capillary 8. The external diameter of external cap surface 21 is substantially the same as the external sleeve surface 14.

In order to remove tube 10, end cap 18 at the upstream end of capillary 8 is first removed. A removal tool (not shown) is inserted into the tube as to engage the tube's inner surface 12. It is further suggested by the prior art that in order to remove tube 10 it may be necessary to apply a slight torque orthogonal to axis 15, or other appropriate means such as bonding a removal tool to the tube using an adhesive. Once the tube is withdrawn, a replacement tube may be inserted into sleeve 9. However, this too is difficult and cumbersome, requiring tools to remove and replace the inner capillary tube.

In a co-pending application, the design and use of a multiple part capillary is described. With reference first to FIG. 3, shown is multiple part capillary 35 according to the preferred embodiment of the co-pending application. As depicted in FIG. 3, multiple part capillary 35 comprises: first section 28 having capillary inlet end 26 and first channel 27; union 29 having o-ring 31; second section 33 having second channel 32 and capillary outlet end 34; and metal coatings 30A and 30B. First section 28 is connected to second section 33 by union 29. In the preferred embodiment according to the co-pending application, union 29 is substantially cylindrical having two coaxial bores, 60 and 61, and through hole 62 of the same diameter as channels 26 and 32. Section 28 and union 29 are preferably composed of metal (e.g., stainless steel). The inner diameter of bore 60 and the outer diameter of section 28 are chosen to achieve a "press fit" when section 28 is inserted into bore 60. Because the press fit is designed to be tight, union 29 is thereby strongly affixed to section 28 and a gas seal is produced between union 29 and section 28 at the surface of bore 60.

The inner diameter of bore 61 is of slightly larger diameter than the outer diameter of section 33 (including metal coating 30A) so as to produce a "slip fit" between union 29 and section 33. A gas seal is established between bore 61 and section 33 via o-ring 31. Electrical contact is also established between metal coating 30A, union 29, and section 28 via direct physical contact between the three. Through hole 62 allows for the transmission of gas from entrance end 26 through to exit end 34 of the capillary. Ideally, union 29 and sections 28 and 33 are formed in such a way as to eliminate any "dead volume" between these components. To accomplish this, the ends of sections 28 and 33 are formed to be flush with the inner surface of union 29. Note that the body of section 33—excluding metal coatings 30A and 30B—is composed of glass in the preferred embodiment. As a result, metal coating 30A—together with union 29 and section 28—can be maintained at a different electrical potential than metal coating 30B.

Alternatively, union 29, and sections 28 and 33 may be composed of a variety of materials, either conducting or non-conducting; the outer diameters of the sections may differ substantially from one another; the inner diameters of the sections may differ substantially from one another; either or both ends or any or all sections may be covered with a metal or other coating; rather than a coating, the ends or capillary sections may be covered with a cap composed of metal or other material; the capillary may be composed of more than two sections always with one fewer union than sections; and the union may be any means for removably securing the sections of capillary together and providing an airtight seal between these sections.

In a preferred embodiment of the capillary according to the co-pending application, the length of first section 28 is less than (even substantially less than) the length of second section 33. More specifically, the dimensions of first section 28 and second section 33 are such that within a range of desired pressure differentials across capillary 35, a gas flow rate within a desired range will be achieved. For example, the length of second section 33 and the internal diameter of second channel 32 are such that the gas transport across second section 33 alone (i.e., with first section 28 removed) at the desired pressure differential will not overload the pumps which generate the vacuum in the source chamber of the system. This allows the removal (e.g., for cleaning or replacement) of first section 28 of capillary 35 without shutting down the pumping system of the mass spectrometer.

Turning next to FIG. 4, an alternate embodiment of capillary 35 is shown wherein capillary section 28 has a serpentine internal channel 64. That is, the geometric structure of the internal channel of the capillary section is sinusoidal. Of course, other geometrical structures (i.e., helical, varying diameter, non-uniform, etc.) may be used in accordance with the invention. Having sinusoidal internal channel 64 causes larger particles—such as droplets from an electrospray—to collide with the walls of the channel and thereby not pass completely through the capillary. On the other hand, smaller particles—such as fully desolvated electrosprayed ions—do not collide with the walls and pass completely through the capillary. The curved (or sinusoidal) geometry of channel 64 also increases the length of the channel, which provides the advantage of permitting a larger diameter channel. Such a larger diameter channel may be advantageous in that it may provide greater acceptance of sampled species (e.g., electrosprayed ions, etc.) at a given flow rate and pressure differential. Alternatively, a sinusoidal—or any other geometry—channel may be used in either first section 28 or second section 33, or both.

As discussed above, having such a curved channel tends to limit the passage of droplets through first section 28. As a result, the multiple part capillary according to the co-pending application limits the contamination to the first section. Although second section 33 might not be removable without shutting down the vacuum system, first section 28 can be removed for cleaning. Limiting contamination to section 28 is thus valuable in the maintenance and use of the instrument of which the capillary is a part. The multiple part capillary according to the co-pending application thus has advantages over prior art that it is easy to remove the first section of capillary, removal of the first section of capillary does not require that the vacuum system of the instrument be shut down, and most if not all contamination of the capillary can be limited to the first capillary section.

Prior art designs for the transfer capillary as discussed with respect to FIGS. 1 and 2 also have inherent limitations relating to geometry, orientation, and ease of use. The capillary according to these prior art designs is substantially fixed in the source. Only if the instrument—or at least the source—is vented to atmospheric pressure can the capillary be removed. The geometric relation of the capillary is therefore fixed with respect to the source and all its components. This implies that the ion production means (e.g., an electrospray needle, atmospheric pressure chemical ionization sprayer, or MALDI probe) must be positioned with respect to the capillary entrance. In order to change from one ion production means to another (e.g., from an electrospray needle to a nano electrospray needle) the first means must be removed from the vicinity of the capillary entrance and the second must then be properly positioned with respect to the capillary entrance. For any production means, there will be an optimum geometry between the means and the capillary entrance at which the ion current passing into the analyzer is maximized. To achieve this optimum, a positioning means must be provided for positioning the ion production means with respect to the capillary entrance. This might take the form of precision machined components, a translation stage on which the ion production means is mounted, or some other device.

This limitation is exemplified in the prior art design of Valaskovic et al. U.S. Pat. No. 5,788,166. Valaskovic et al. disclose the prior art nanoelectrospray design shown in FIGS. 5 and 6. As shown in FIGS. 5 and 6, a nanospray needle 63 is glued onto the end of the mount 65, which is turn is attached to an X, Y, Z stage 70 for fine positioning with respect to the capillary inlet 66 which leads to mass analyzer 68. Flow through the tip 72 of the ESI needle is monitored by a microscope 74 with assistance from an illuminator 76. Needle mount 65 includes an insulating portion 78, and an electrical contact 80. A positive or negative inlet potential is applied from a power supply 82 through the copper contact 80 to the needle tip 72 for effecting electrospray into the capillary inlet 66. To deliver analyte to distal end 84 of ESI needle 63, capillary 86 of glass or plastic is provided which is filled with analyte 88. This process is very difficult, requiring the needle to be prepared, then glued onto the end of a mount and positioned with the help of a microscope and illuminator.

The nanospray device and methods associated therewith typically employ single use nanospray needles. Such a nanospray needle is typically loaded with the sample solution from its distal using a micropipette. Because the capillaries employed are single use, each capillary has to be assembled into the setup and precisely positioned—using the X,Y,Z translation stage and set-up—with respect to capillary 66 after each sample loading. This also adds a significant amount of time to the analysis of any given sample. Also, because a new capillary is used for each analysis, and because each new capillary is independently positioned with the translation stage, experiment conditions are not reproducible with great accuracy from one analysis to another.

Applicant has recognized the need for a nanospray apparatus and method wherein positioning of the nanospray needle with respect to the capillary and experimental conditions in general are more reproducible and wherein the apparatus is easier to use than in prior art. This would result in more consistent and reproducible results.

A nanospray device according to the present invention includes the use of a multiple part capillary. The first section of capillary is integrated in the nanospray assembly. As a result the positioning of the nanospray needle with respect to the capillary entrance is easier to achieve reproducibly than in prior art nanospray devices and requires no lamp or microscope as detailed with respect to the prior art of FIGS. 5 and 6. Further, as a consequence of the use of the multiple part capillary, the nanospray assembly is easy to remove from the instrument and easy to clean.

SUMMARY OF THE INVENTION

To achieve the foregoing objectives of the present invention, a device and method for introducing a sample into a mass spectrometer is presented. It is an object of the invention to provide a simply constructed, easy to operate and highly efficient sample introducing apparatus wherein the liquid sample is sprayed into fine particles and provides easy and effective supply of the sample to the MS. An apparatus according to the present invention comprises a spray needle with at least one opening for acceptance of a liquid flow and a tip for removal of said liquid. The spray needle preferably terminates in an electrospray device (e.g., an electrospray needle) for the creation of charged particles of the liquid flow for introduction into the mass spectrometer. Upon exiting the tip of the spray needle, the charged particles of the liquid flow are introduced to the multiple part capillary. The capillary consists of at least two sections which are joined together end to end such that the charged particles of the liquid flow can be transmitted through the capillary across a pressure differential. Between the two sections of the capillary exists a union which allows for the removal of the present invention, without breaking the seal between the pressure differentials.

Unlike the previous technology, the present invention allows the practitioner to easily insert and align the spray needle and capillary. There is no need for microscopes, or difficult adjustment. Rather the spray needle is simply inserted and adjusted outside the source and the equipment is ready to perform its function within the mass spectrometer. The present invention reduces set-up time and increases the speed in which mass spectrometry can be carried out, because the capillary can be easily replaced.

In certain embodiments, it may be desirable to form a coating on either the spray needle or capillary. A metal coating may be formed on the capillary and spray needle in order to cause the two to be in electrical communication. The coating can be any suitable material. This metal coating may also serve the purpose of providing the spray needle and capillary with added durability. Alternatively, a voltage may be applied directly to the liquid flow, by placing an electrically conductive material in electrical contact with the liquid flow.

It is intended that the present invention may be used with a number of different methods of ion production. This includes, but is not limited to, traditional electrospray, nano electrospray, pneumatically assisted electrospray, and other techniques.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRTPTTON OF THE DRAWING

A further understanding of the present invention can be obtained by reference to a preferred embodiment set forth in the illustrations of the accompanying drawings. Although the illustrated embodiment is merely exemplary bf systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

Figure 9:
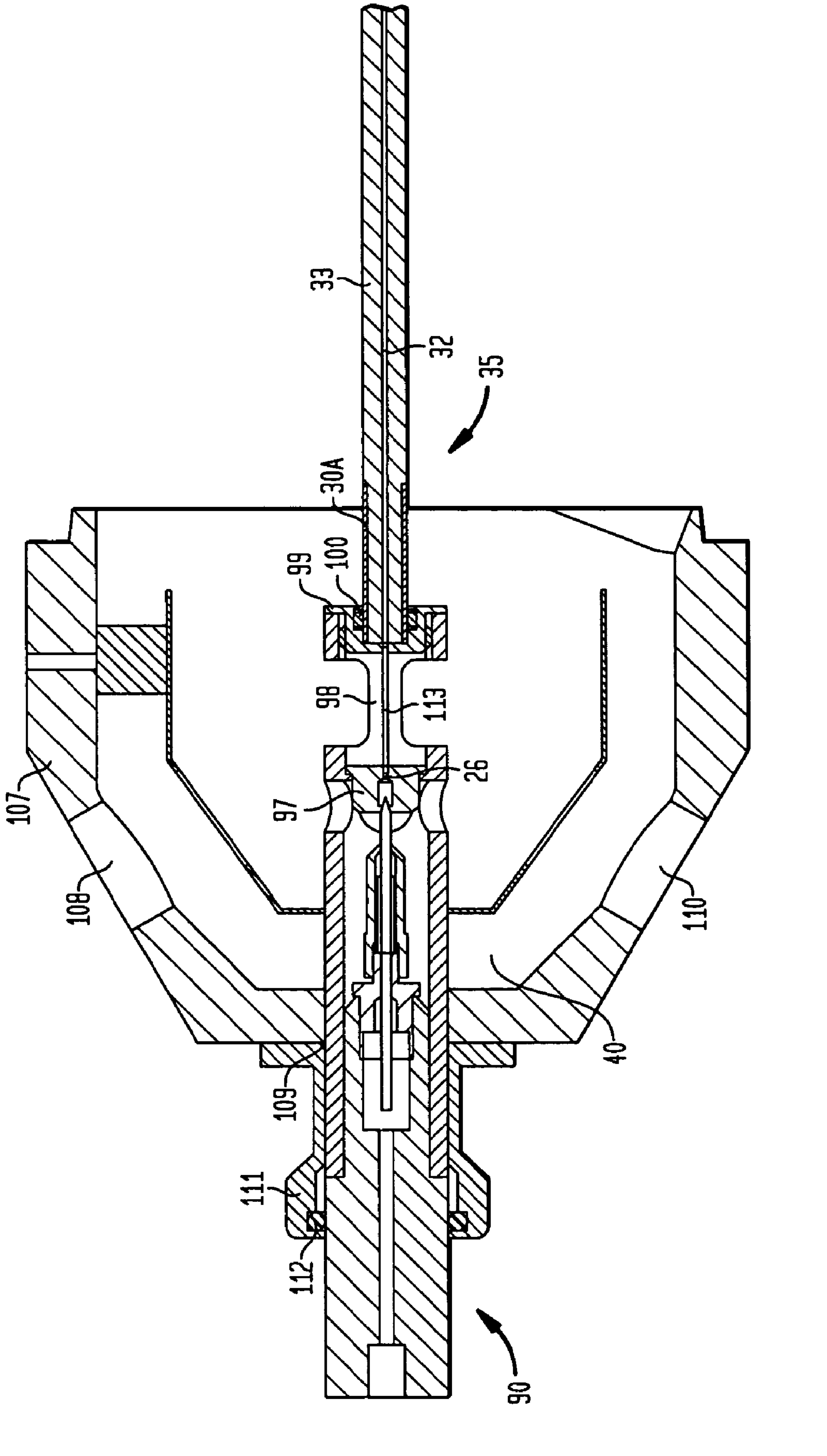
Figure 10:
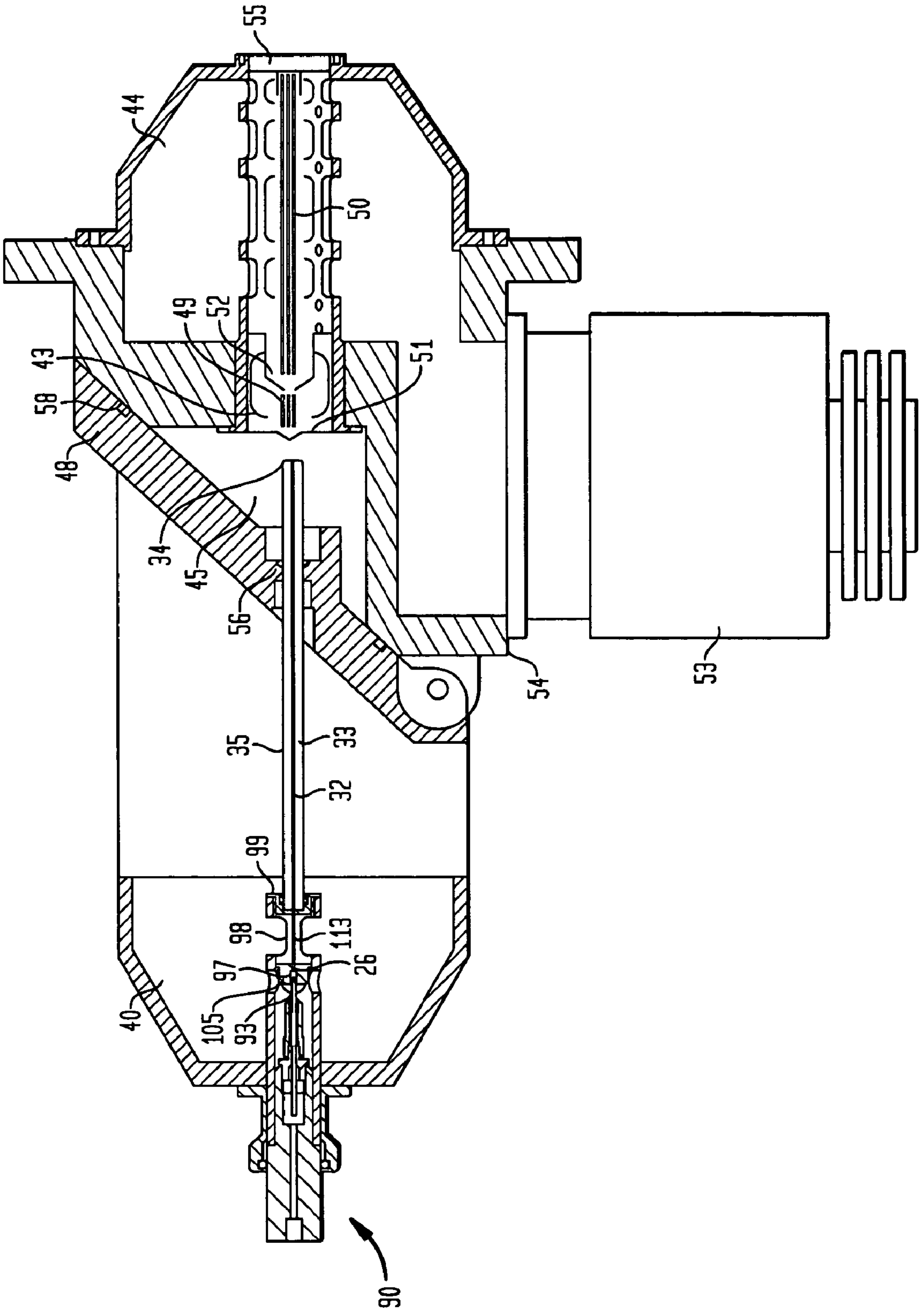

FIG. 9 depicts the nanospray assembly according to the preferred embodiment of the present invention inserted into a spray chamber designed according to co-pending application entitled IONIZATION CHAMBER FOR ATMOSPHERIC PRESSURE IONIZATION MASS SPECTROMETRY; and FIG. 10 depicts the nanospray assembly according to the present invention as integrated into a source according to co-pending application entitled IONIZATION SOURCE FOR MASS SPECTROMETRY.

DETAILED DESCRIPTION OF A PREFERRED EMBODIMENT

As required, a detailed illustrative embodiment of the present invention is disclosed herein. However, techniques, systems and operating structures in accordance with the present invention may be embodied in a wide variety of sizes, shape, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

The following presents a detailed description of a preferred embodiment of the present invention, as well as some alternate embodiments of the invention. As discussed above, the present invention relates generally to the mass spectroscopic analysis of chemical samples and more particularly to mass spectrometry. Specifically, an apparatus and method are described for the production of ions and subsequent transport of said ions into a mass spectrometer. Reference is herein made to the figures, wherein the numerals representing particular parts are consistently used throughout the figures and accompanying discussion.

Figure 7:
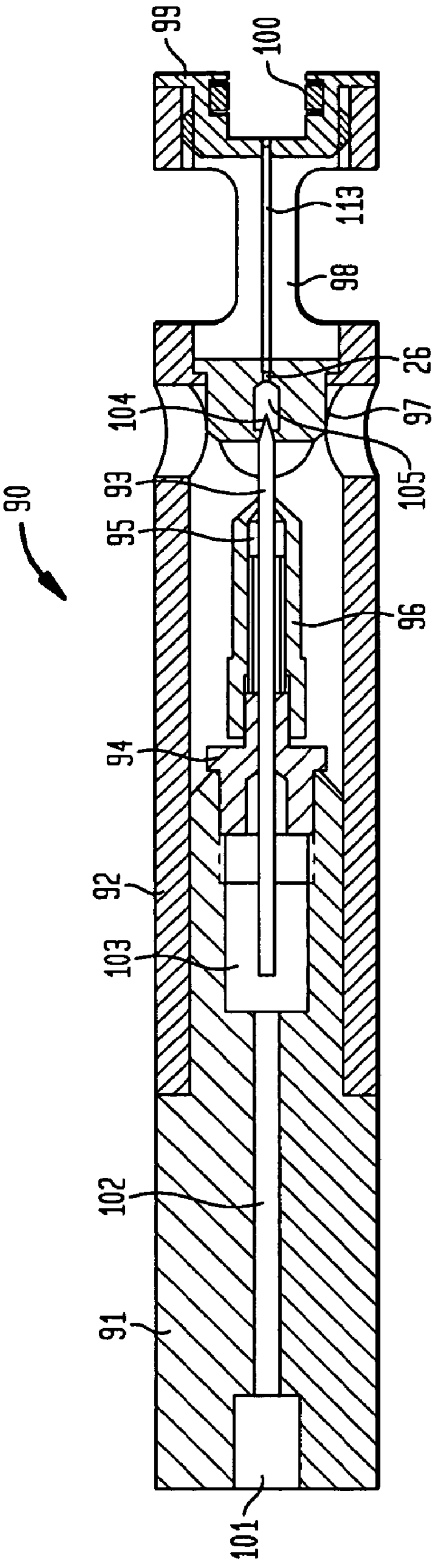
FIG. 7 depicts a nanospray assembly according to the preferred embodiment of the present invention.

Referring first to FIG. 7, depicted is the cross section of the preferred embodiment of the nanospray assembly according to the present invention. Nanospray assembly 90 consists of electrically conducting base 91, non-conducting outer cylinder 92, nanospray needle 93, union 94, conducting gasket 95, retainer 96, entrance cap 97, capillary section 98, union 99, and o-ring 100. Assembly 90 and all of its components are substantially cylindrically symmetric. Base 91 is preferably made of metal such as stainless steel. Base 91 includes tapped hole 101, appropriate for a gas line connection, and channel 102 leading from hole 101 to gas reservoir 103. Opposite channel 102, reservoir 103 is enclosed by union 94, and nanospray needle 93. Needle 93 is held in place via retainer 96 and associated and gasket 95. Gasket 95 serves to form an air tight seal between needle 93 and retainer 96 such that gas supplied via hole 101 will be substantially trapped in channel 102 and reservoir 103. Further, gasket 95 provides an electrical contact between needle 93 and retainer 96.

In the preferred embodiment, needle 93 is made of glass with a metal vapor deposit on the outer surface of the needle. Base 91, union 94, and retainer 96 are all composed of metal—preferably stainless steel. When fully assembled, base 91, union 94, retainer 96, gasket 95, and the metal coating of needle 93 are all in electrical contact. The metal coating of needle 93 is further in electrical contact with analyte solution on the interior and at tip 104 of spray needle 93. Thus, the potential of analyte solution in spray needle 93 is controlled during operation via an electrical connection to base 91.

Section 98 is a stainless steel tube of inner diameter 0.5 mm. Cap 97 and union 99 are also composed of stainless steel. Section 98 is fixed into cap 97 and union 99 via holes in the caps. The inner diameter of the holes in cap 97 and union 99 and the outer diameter of section 98 are such that the holes and section 98 form a “press fit”. Section 98 and cap 97 and union 99 together are fixed in cylinder 92. Base 91 together with union 94, needle 93, and retainer 96 is inserted from the opposite end of cylinder 92 such that tip 104 of nanospray needle 93 is inside hole 105 of entrance cap 97.

Figure 8:
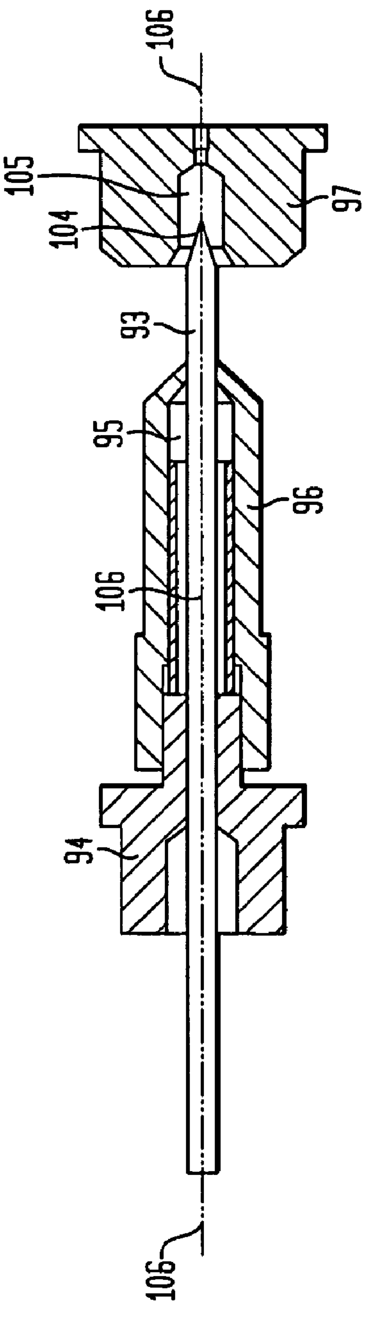
FIG. 8 is a detailed depiction of the nanospray needle and components immediately adjacent to it within the nanospray assembly according to the present invention.

Turning next to FIG. 8, shown is a detailed depiction of components immediately adjacent to nanospray needle 93 in the completed nanospray assembly. Hole 105 in entrance cap 97 is designed especially to receive the tip of nanospray needle 93. In operation, nanospray needle 93 and entrance cap 97 are at different electrical potentials—by about 1000 V. It is this potential difference which induces the spray process. However, the strength of the field at tip 104 of spray needle 93 is of critical. importance in producing a spray and subsequently ions. The potential difference between needle 93 and cap 97 might be 1000 V without inducing a spray. If needle 93 is too far from entrance cap 97 then the field strength at tip 104 of needle 93 will be too low and no spray will be formed. If needle 93 is to close to entrance cap 97 then an arc will form between needle 93 and cap 97—and no spray will be formed. Hole 105 of entrance cap 97 is designed to ease the positioning of needle 93 with respect to cap 97. Because hole 105 is cylindrical and significantly greater in length than in diameter, tip 104 of needle 93 can be located in a range of positions in hole 105 without great influence on the strength of the field at tip 104. That is, because hole 105 is cylindrical, there is a range of positions along the axis of hole 105 within which the distance between these positions and the nearest point on the surface of hole 105 is a constant. Assuming the potential difference between cap 97 and needle 93 is a constant, and the distance between tip 104 and cap 97 is a constant within the above mentioned range of positions, the strength of the field at tip 104 will also be a constant.

The positioning of needle 93 with respect to capillary section 98 (as shown in FIG. 7) is thus one dimensional (i.e., along the longitudinal axis 106 of needle 93). The position of needle 93 is fixed in the plane perpendicular to axis 106 by the mechanical alignment of components 91 through 100 in assembly 90. Along axis 106, there is a range of needle positions over which spray and ions are readily formed. In our experience needle 93 should extend 7 mm, +/−1 mm, from the end of retainer 96 in order to provide a useable ion current.

The positioning of needle 93 is eased further in that needle 93 is positioned within assembly 90 independent of the remainder of the source and instrument. That is, to exchange spray needles and/or samples, assembly 90 is first extracted from the source. Then, on the bench, base 91—together with union 94, retainer 96, and needle 93—is extracted from assembly 90. Retainer 96 is loosened by partially unscrewing it thus allowing needle 93 to be removed. A new nanospray needle is produced or obtained from a manufacturer. Analyte solution is loaded into the new needle via micropipette from the distal end of the needle. The new needle 93 is then inserted into retainer 96 so that it extends about 7 mm, +/−1 mm, beyond retainer 96. Retainer 96 is then tightened, and base 91—together with union 94, retainer 96, and needle 93—is reinserted into cylinder 92 to complete assembly 90. Assembly 90 is finally reinserted into the source.

The complete assembly 90, as inserted into spray chamber 40, is depicted in FIG. 9. Notice that spray chamber cover 107 includes a number of ports, three of which—108, 109, and 110—are shown. This spray chamber is designed in accordance with co-pending application IONIZATION CHAMBER FOR ATMOSPHERIC PRESSURE IONIZATION MASS SPECTROMETRY. Further, adapter 111 with electrical contact spring 112 is fitted over port 109. Nanospray assembly 90 is inserted through adapter 111 and port 109 until finally coming into contact with and fitting over capillary section 33. At this point o-ring 100 forms a seal between capillary section 33 and union 99. In this way multiple part capillary 35 is formed from capillary sections 98 and 33 in accordance with copending application METHOD AND APPARATUS FOR A MULTIPLE PART CAPILLARY DEVICE FOR USE IN MASS SPECTROMETRY. Notice that assembly 90 can be inserted and extracted from spray chamber 40, without tools, by simply pushing and pulling respectively assembly 90 through port 109 along axis 106.

When inserted into spray chamber 40, nanospray assembly 90 is supported on one end by adapter 111 and port 109 and is supported on the other end by capillary 33. In the preferred embodiment, cover 107 is electrically grounded by contact with the rest of the source (not shown). Adapter 111 is grounded by contact with cover 107. And base 91—together with union 94, spray needle 93, and retainer 96—is grounded by contact with adapter 111 via spring contact 112. Capillary section 98 together with cap 97 and union 99 are held at a high potential via metal coating 30A on capillary section 33.

Figure 5:
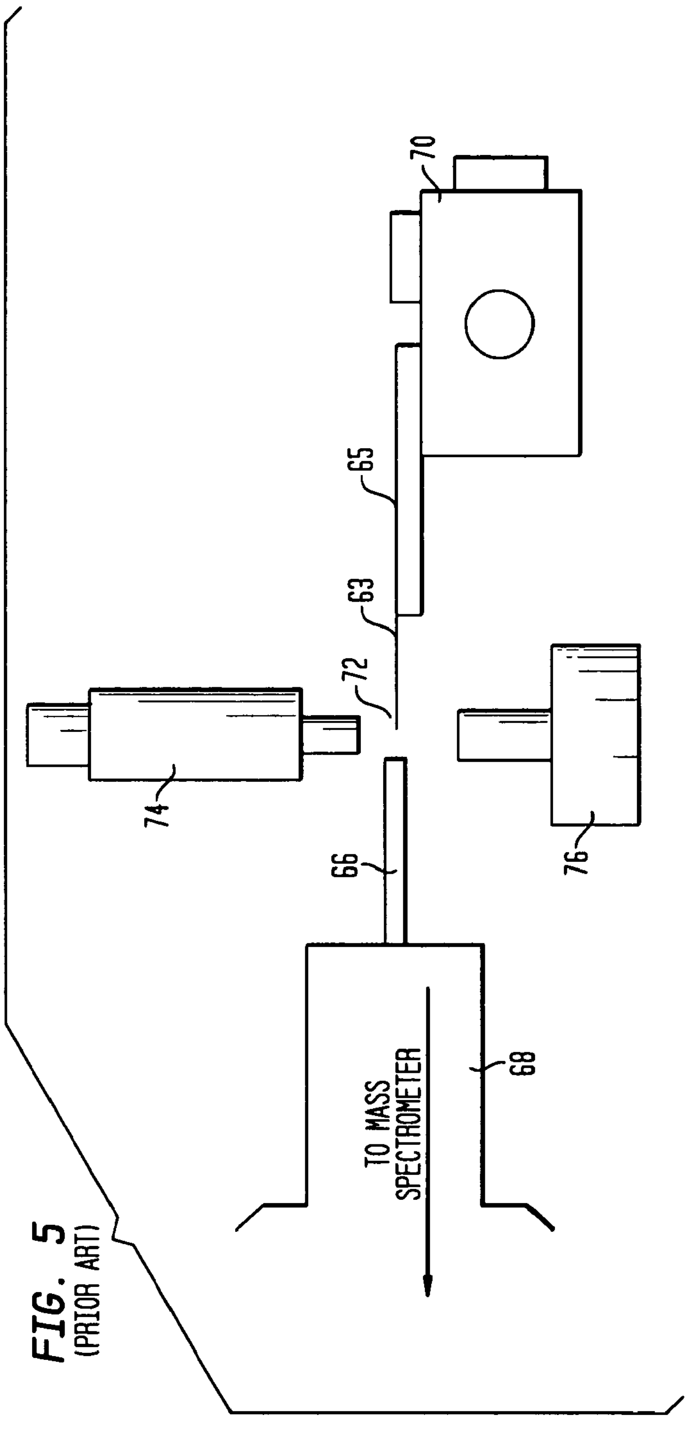
FIG. 5 (PRIOR ART)
FIG. 5 depicts a prior art nanoelectrospray device which uses a microscope and illuminator to align the nanospray needle with the capillary entrance.
Figure 6:
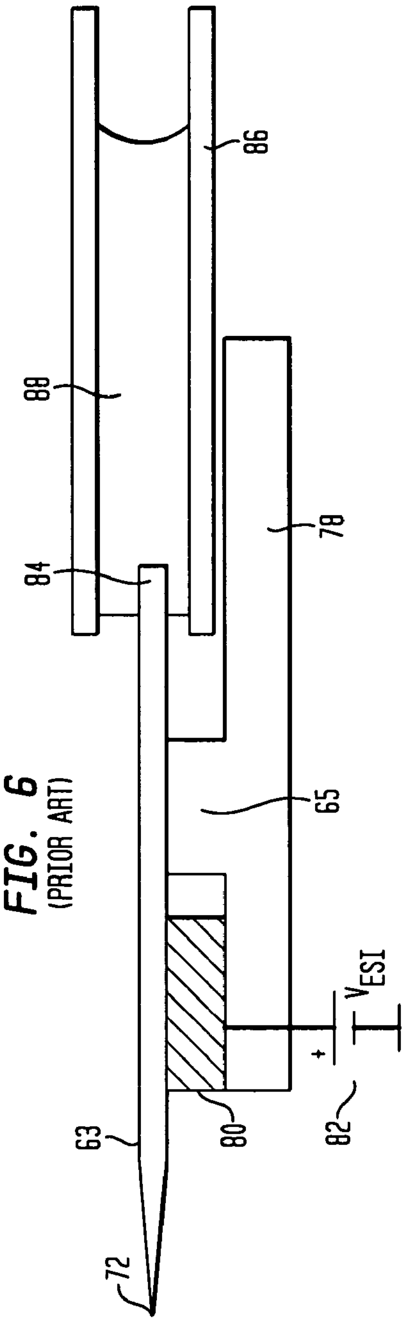
FIG. 6 (PRIOR ART)
FIG. 6 is a detailed view of the prior art nanospray needle s shown in FIG. 5 loaded with sample and charged to a potential.

Depicted in FIG. 10 is nanospray assembly 90 as it is inserted into spray chamber 40 of a complete ionization source designed according to co-pending application IONIZATION SOURCE FOR MASS SPECTROMETRY. During normal operation of preferred embodiment nanospray assembly 90, sample solution is formed into droplets at atmospheric pressure by spraying the sample solution from spray needle 93 into spray chamber 40. The spray is induced by the application of a high potential between spray needle 93 and entrance cap 97 within spray chamber 40. Sample droplets from the spray evaporate while in spray chamber 40 thereby leaving behind an ionized sample material (i.e., sample ions). These sample ions are accelerated toward capillary inlet 26 of capillary section 98 by the electric field between spray needle 93, entrance cap 97 and inlet 26 of first section 98 of capillary 35 and by the flow of gas towards and into inlet 26. The design of entrance cap 97 provides the additional advantage over prior art nanospray devices that the gas flow through hole 105 tends to focus ions into inlet 26. In prior art nanospray devices, such as depicted in FIG. 5, the gas flow near the tip of the nanospray needle is not well controlled. That is, gas flows from all possible directions into the channel of capillary 66. The gas flow passed tip 72 of spray needle 63 is dependent—in a non-linear way—on the distance between tip 72 and capillary 66.

In contrast, gas flow in the nanospray assembly according to the present invention is well controlled. All gas entering channel 113 must flow through hole 105. Because needle tip 104 is inserted into hole 105 for normal operation, ions produced at tip 104 are immediately entrained in the gas flow and transported to and through channel 113. As a result, the position of spray needle.93 within the assembly is again less critical than in prior art devices.

The ions are transported through first channel 113 into and through second channel 32 to capillary outlet 34. As described above first section 98 is joined to second section 33 in a sealed manner by union 99. The flow of gas created by the pressure differential between spray chamber 40 and first transfer region 45 further causes ions to flow through the capillary channels from the spray chamber toward exit elements 55 and the mass analyzer (not shown).

Still referring to FIG. 10, first transfer region 45 is formed by mounting flange 48 on source block 54 where a vacuum tight seal is formed between flange 48 and source block 54 by o-ring 58. Capillary 35 penetrates through a hole in flange 48 where another vacuum tight seal is maintained (i.e., between flange 48 and capillary 35) by o-ring 56. A vacuum is then generated and maintained in first transfer 45 by a pump (e.g., a roughing pump, etc., not shown). The inner diameter and length of capillary 35 and the pumping speed of the pump are selected to provide as high a rate of gas flow through capillary 35 as reasonably possible while maintaining a pressure of 1 mbar in the first transfer region 45. A higher gas flow rate through capillary 35 will result in more efficient transport of ions.

Next, as further shown in FIG. 10, first skimmer 51 is placed adjacent to capillary exit 34 within first transfer region 45. An electric potential between capillary outlet end 34 and first skimmer 51 accelerates the sample ions toward first skimmer 51. A fraction of the sample ions then pass through an opening in first skimmer 51 and into second pumping region 43 where pre-hexapole 49 is positioned to guide the sample ions from the first skimmer 51 to second skimmer 52. Second pumping region 43 is pumped to a lower pressure than first transfer region 45 by pump 53. Again, a fraction of the sample ions pass through an opening in second skimmer 52 and into third pumping region 44, which is pumped to a lower pressure than second pumping region 43 via pump 53.

Once in third pumping region 44, the sample ions are guided from second skimmer 52 to exit electrodes 55 by hexapole 50. While in hexapole 50 ions undergo collisions with a gas (i.e., a collisional gas) and are thereby cooled to thermal velocities. The ions then reach exit electrodes 55 and are accelerated from the ionization source into the mass analyzer (not shown) for subsequent analysis.

While the above embodiment is of a nanoelectrospray assembly and its use in an electrospray ion source, alternate embodiments could employ any type of sprayer—i.e. nanospray needle, pneumatic spray needle, microspray needle etc. Further, any type of API ionization method might potentially be used in such an assembly. Also, such an assembly might be used simultaneously with a multitude of sprayers or ionization methods.

It should be noted that any other method known from prior art might be used in conjunction with the nanospray assembly according to the present invention. For example, an electric heater might be used to heat first capillary section 98. A thermocouple or other such device could be used to monitor the temperature of section 98. In such an embodiment, it would be useful to make capillary section 98 from electrically insulating material—e.g. glass. By using glass for section 98, heater wire could be wrapped directly on section 98 and can be operated at near ground potential—rather than the potential of entrance cap 97. Alternatively, heated gas or any other heating method could be used instead of the electrical heater to heat capillary section 98.

Figures 1, 2:
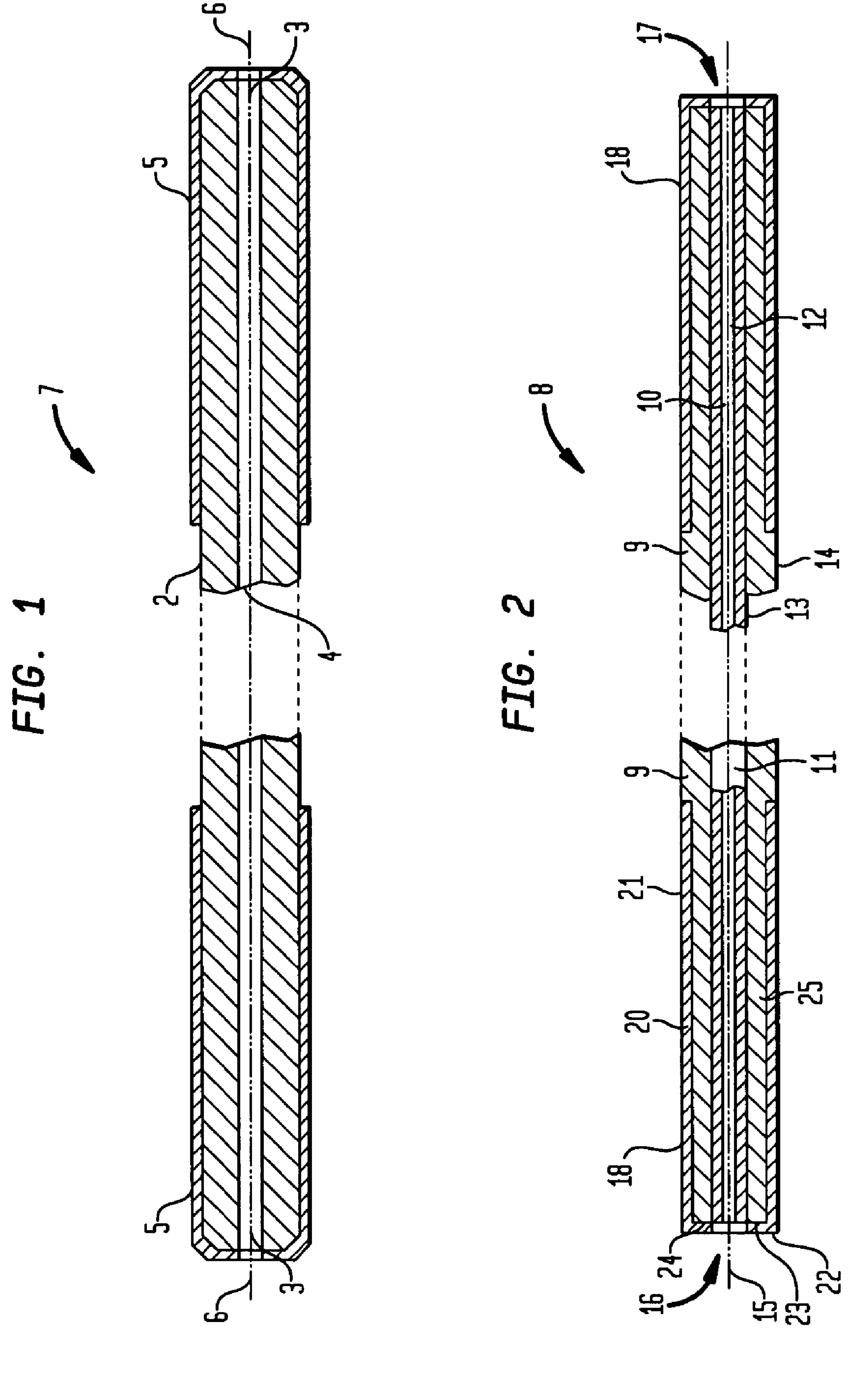
FIG. 1 shows a partial cut-away cross-sectional view of a prior art capillary comprising a unitary glass tube having a cylindrical outer surface and internal bore.
FIG. 2 shows a partial cut-away cross sectional view of another prior art capillary comprising a concentric outer capillary sleeve and inner capillary tube.
Figure 3:
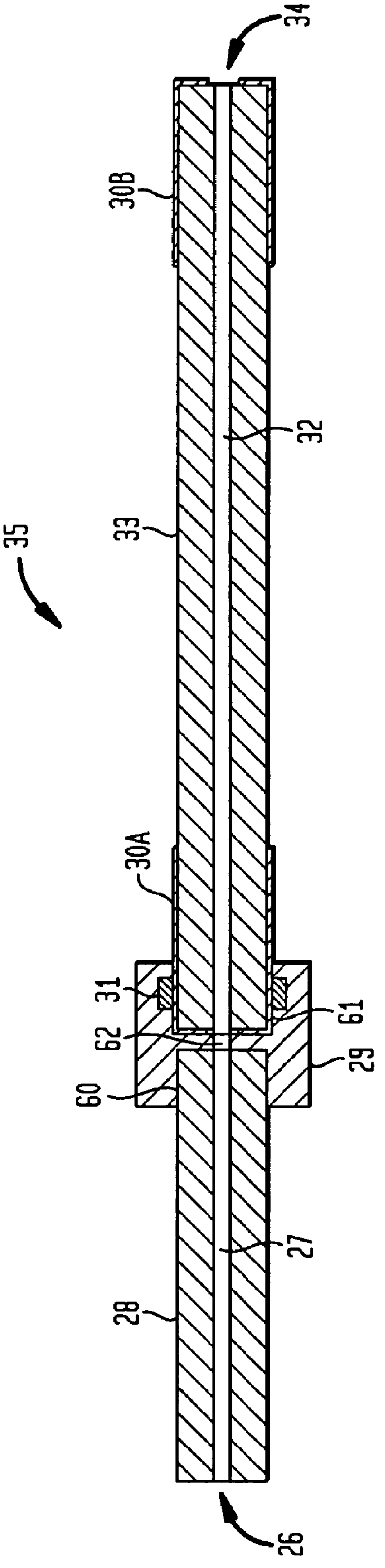
FIG. 3 shows a multiple part capillary in accordance with co-pending application entitled METHOD AND APPARATUS FOR A MULTIPLE PART CAPILLARY DEVICE FOR USE IN MASS SPECTROMETRY.
Figure 4:
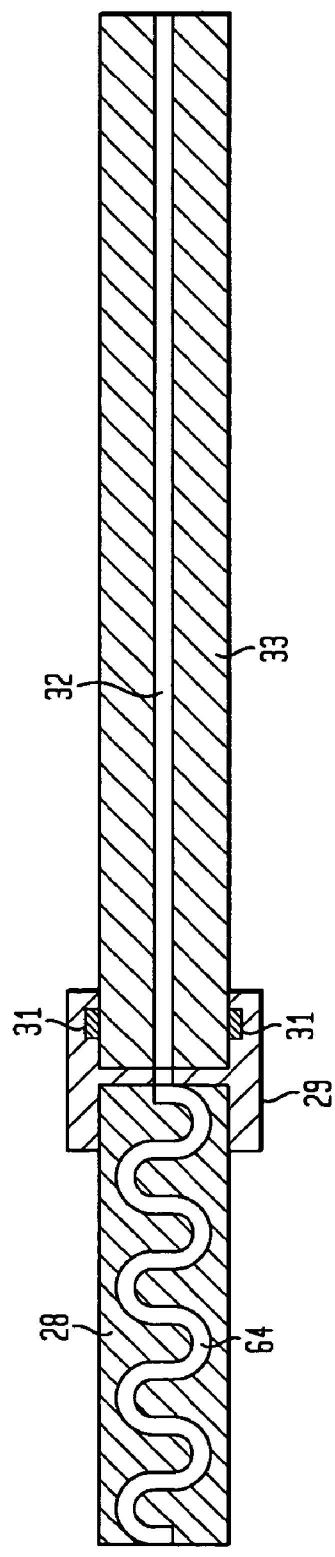
FIG. 4 shows an alternate embodiment multiple part capillary in accordance with co-pending application entitled METHOD AND APPARATUS FOR A MULTIPLE PART CAPILLARY DEVICE FOR USE IN MASS SPECTROMETRY wherein the channel of the first capillary section is curved.

Further, capillary section 98 (or 33) might be constructed so as to have a curved channel as depicted with regard to channel 64 in FIG. 4. Alternatively, capillary section 98 as well as channel 113 might be curved (i.e., as in a bent tube). Capillary sections 98 and 33 might be constructed of any material including stainless steel or glass and might include coatings or caps as depicted with regard to metal coatings 30A and 30B on capillary section 33 of FIG. 3.

Also, any kind of mass analyzer—e.g. Fourier transform mass analyzer, time of flight mass analyzer, quadrupole or quadrupole trap mass analyzers etc.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. An apparatus for introducing sample ions into a mass spectrometer, said apparatus comprising:

- a housing configured for removably interfacing with an entrance orifice of a first vacuum region of a mass spectrometer such that said ions introduced through said entrance orifice are further introduced into and through a capillary into said vacuum region of said mass spectrometer;
- a spray needle assembly positioned within said housing, said assembly including a needle with an outer surface and a means for adjustably positioning said needle within said assembly; and
- a means for securing a capillary within said housing in coaxial alignment with said spray needle assembly, said capillary having a first end for receiving sample ions from said needle and a second end for delivering said sample ions into said entrance orifice;
- wherein at least one of said needle and said means for securing said capillary has a potential applied thereto for establishing a potential difference therebetween, and wherein said potential difference ionizes said sample.

2. An apparatus according to claim 1, wherein said needle is made of glass.

3. A needle according to claim 1, wherein said needle comprises a metal vapor deposit on its outer surface.

4. An apparatus according to claim 1, wherein said capillary is made from a flexible material.

5. An apparatus according to claim 1, wherein said capillary is made from a rigid material.

6. An apparatus according to claim 1, wherein said capillary comprises a channel having a helical, curved, bent or sinusoidal structure.

7. An apparatus according to claim 1, wherein said mass spectrometer comprises an ionization source which is selected from the group consisting of an atmospheric pressure ionization (API) source, an electrospray ionization source, a pneumatic assisted electro spray ionization source, an electron impact source, a chemical ionization source, a matrix-assisted laser desorptionionization (MALDI) source, a plasma desorption source, and a liquid chromatography source.

8. An apparatus according to claim 1, wherein said mass spectrometer is selected from the group consisting of a quadrupole mass spectrometer, a time-of-flight mass spectrometer, an ion trap mass spectrometer, an ion cyclotron resonance mass spectrometer, and a magnetic sector mass spectrometer.

9. An apparatus according to claim 1, wherein the position of said spray needle assembly may be adjusted by movement of said assembly along its longitudinal axis.

10. An apparatus according to claim 1, wherein said spray needle assembly further comprises a base, a union and a retainer.

11. An apparatus according to claim 1, wherein said base, said union and said retainer are comprised of an electrically conductive material.

12. An apparatus according to claim 1, wherein said base, said union and said retainer, are in electrical contact with each other.

13. A method for introducing sample ions into a mass spectrometer, said method comprising the steps of:

- introdueing a sample from a spray needle assembly to an entrance cap of a capillary, said assembly including a needle with an outer surface and a means for adjustably positioning a needle within said assembly;
- ionizing a sample with an ionization source, said source including a housing configured for removably interfacing with an entrance orifice of a first vacuum region of a mass spectrometer such that said ions introduced through said orifice are further introduced into and through a capillary into a vacuum region of a mass spectrometer;
- accelerating said ions through said entrance cap into capillary channel by applying a potential difference across said entrance cap and said spray needle tip;
- cooling said ions to thermal velocities upon exiting said capillary channel; and
- sending said cooled ions to said mass spectrometer for mass analysis.

14. A method according to claim 13, wherein said mass spectrometer is selected from the group consisting of a quadrupole mass spectrometer, a time-of-flight mass spectrometer, an ion trap mass spectrometer, an ion cyclotron resonance mass spectrometer, and a magnetic sector mass spectrometer.

15. A method according to claim 13, wherein said ionization source is selected from the group consisting of an atmospheric pressure ionization (API) source, an electrospray ionization source, a pneumatic assisted electrospray source, an electron impact source, a chemical ionization source, a matrix-assisted laser desorption/ionization source, a plasma desorption source, and a liquid chromatography source.

16. A method according to claim 13 wherein said capillary is made from a flexible material.

17. A method according to claim 13 wherein said capillary is made from a rigid material.

18. A method according to claim 13, wherein said capillary comprises a channel having a helical, curved, bent or sinusoidal structure.

19. A method according to claim 13, wherein said potential difference between said spray needle tip and said entrance cap is at least 1000 volts (V).

20. A method according to claim 13, wherein said potential difference between said spray needle tip and said entrance cap is about 1000 V.

21. A method according to claim 13, wherein said sample ions are introduced through said capillary channel via gas flow.

22. A method according to claim 13, wherein said gas flow is greater than 1 Megabar (Mbar).

23. A method according to claim 13, wherein said ions are cooled using a collision gas.

24. A method according to claim 23, wherein said collision gas is helium.

* * * * *